United States Patent
Chang et al.

(10) Patent No.: US 12,475,585 B2
(45) Date of Patent: Nov. 18, 2025

(54) METHOD AND APPARATUS WITH POSE ESTIMATION

(71) Applicant: Samsung Electronics Co., Ltd., Suwon-si (KR)

(72) Inventors: Hyun Sung Chang, Seoul (KR); Seungeon Kim, Incheon (KR); Minjung Son, Suwon-si (KR); Wonhee Lee, Yongin-si (KR); Kyungboo Jung, Seoul (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 748 days.

(21) Appl. No.: 17/735,541

(22) Filed: May 3, 2022

(65) Prior Publication Data
US 2023/0154026 A1 May 18, 2023

(30) Foreign Application Priority Data
Nov. 15, 2021 (KR) ........................ 10-2021-0156891

(51) Int. Cl.
*G06T 7/593* (2017.01)
*G06T 7/73* (2017.01)

(52) U.S. Cl.
CPC ................ *G06T 7/593* (2017.01); *G06T 7/73* (2017.01)

(58) Field of Classification Search
None
See application file for complete search history.

(56) References Cited

U.S. PATENT DOCUMENTS

| | | |
|---|---|---|
| 8,587,583 B2 | 11/2013 | Newcombe et al. |
| 9,651,388 B1 | 5/2017 | Chapman et al. |
| 9,940,553 B2 | 4/2018 | Shotton et al. |
| 2023/0035458 A1 | 2/2023 | Ju et al. |

FOREIGN PATENT DOCUMENTS

| | | |
|---|---|---|
| CN | 111583316 A | 8/2020 |
| CN | 109544677 B | 12/2020 |
| CN | 113129249 A | 7/2021 |
| CN | 113129366 A | 7/2021 |
| KR | 10-1460313 B1 | 11/2014 |
| KR | 10-2026376 B1 | 9/2019 |
| KR | 10-2020-0005999 A | 1/2020 |

OTHER PUBLICATIONS

Visual odometry with drift-free rotation estimation visual odometry with drift-free rotation estimation using indoor scene regularities (Year: 2017).*

(Continued)

*Primary Examiner* — Andrew H Lam
(74) *Attorney, Agent, or Firm* — NSIP Law

(57) ABSTRACT

A processor-implemented method with pose estimation includes: determining depth data by sensing a depth of a target scene comprising planes orthogonal to each other; determining normal vectors corresponding to depth points of the depth data; determining orientation data of a device by comparing the normal vectors to orientation candidates; and determining position data of the device based on distances from the device to the planes.

26 Claims, 10 Drawing Sheets

(56) References Cited

OTHER PUBLICATIONS

Visualodometrywithdrift-freerotationestimationvisualodometrywithdrift-freerotationestimationusingindoorsceneregularities(Year:2017) (Year: 2017).*

Brachmann, Eric, et al. "Learning Less is More-6D Camera Localization via 3D Surface Regression" *Proceedings of the IEEE Conference on Computer Vision and Pattern Recognition* 2018 (9 pages in English).

Peng, Sida, et al. "Pvnet: Pixel-wise Voting Network for 6DoF Pose Estimation." *Proceedings of the IEEE/CVF Conference on Computer Vision and Pattern Recognition* 2019 (10 pages in English).

Silberman, Nathan, et al. "Indoor Segmentation and Support Inference from RGBD Images." ECCV (5) 7576 (2012): (14 pages in English).

Kim, Pyojin, et al. "Visual Odometry with Drift-Free Rotation Estimation Using Indoor Scene Regularities." BMVC. vol. 2. No. 6. 2017.

Kim, Pyojin, et al. "Linear RGB-D SLAM for planar environments." Proceedings of the European Conference on Computer Vision (ECCV). 2018.

Arnaud, Adrien, et al. "On the Fly Plane Detection and Time Consistency for Indoor Building Wall Recognition Using a Tablet Equipped with a Depth Sensor." IEEE Access 6 (2018):17643-17652.

Kim, Pyojin, et al. "Low-Drift Visual Odometry in Structured Environments by Decoupling Rotational and Translational Motion." 2018 IEEE international conference on Robotics and automation (ICRA). IEEE, 2018.

Li, Jinyu, et al. "Robust and Efficient Visual-Inertial Odometry with Multi-plane Priors." Pattern Recognition and Computer Vision: Second Chinese Conference, PRCV 2019, Xi'an, China, Nov. 8-11, 2019, Proceedings, Part III. Cham: Springer International Publishing, 2019.

Sun, Qinxuan, et al. "Plane-Edge-SLAM: Seamless Fusion of Planes and Edges for SLAM in Indoor Environments." IEEE Transactions on Automation Science and Engineering 18.4 (2020):2061-2075.

Ram, Karnik, et al. "RP-VIO: Robust Plane-based Visual-Inertial Odometry for Dynamic Environments." 2021 IEEE/RSJ International Conference on Intelligent Robots and Systems (IROS). arXiv:2103.10400v2 [cs.RO] Dec. 5, 2021, IEEE.

Extended European search report issued on Apr. 12, 2023, in counterpart European Patent Application No. 22188691.4 (10 pages in English).

\* cited by examiner

METHOD AND APPARATUS WITH POSE ESTIMATION

CROSS-REFERENCE TO RELATED APPLICATIONS

This application claims the benefit under 35 USC § 119(a) of Korean Patent Application No. 10-2021-0156891, filed on Nov. 15, 2021 in the Korean Intellectual Property Office, the entire disclosure of which is incorporated herein by reference for all purposes.

BACKGROUND

1. Field

The following description relates to a method and apparatus with pose estimation.

2. Description of Related Art

A visual inertial odometry (VIO) may estimate a position, a velocity, and an orientation using a camera, an inertial measurement unit (IMU), or the like. In simultaneous localization and mapping (SLAM), a position may be estimated while localization and mapping are performed simultaneously. The VIO may correspond to an elemental technology related to the localization in the SLAM. The VIO may include a frontend and a backend. At the frontend, a feature point may be extracted from an image. At the backend, a position and an orientation of a device may be estimated using a feature point, IMU information, and the like. Also, at the backend, optimization may be performed based on a graph-based scheme and a filter-based scheme.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with pose estimation includes: determining depth data by sensing a depth of a target scene comprising planes orthogonal to each other; determining normal vectors corresponding to depth points of the depth data; determining orientation data of a device by comparing the normal vectors to orientation candidates; and determining position data of the device based on distances from the device to the planes.

The planes orthogonal to each other may include at least a portion of walls orthogonal to each other and a floor orthogonal to the walls.

The determining of the normal vectors may include: generating three-dimensional (3D) space data comprising scene points corresponding to the depth points by unprojecting the depth data onto a 3D space; determining a first local plane based on a first scene point of the 3D space data and neighboring scene points located in a neighborhood of the first scene point; and determining a first normal vector of the first scene point based on a normal of the first local plane.

The determining of the orientation data may include: determining a matching number of the orientation candidates in response to performing matching between the normal vectors and the orientation candidates; and determining the orientation data based on the matching number of the orientation candidates.

The normal vectors may include a first normal vector, and the determining of the matching number may include matching the first normal vector and one or more orientation candidates having either one of an orthogonal relationship and a parallel relationship with the first normal vector among the orientation candidates.

The determining of the position data may include: determining a scene coordinate system based on the distances from the device to the planes and the orientation data; and determining coordinates corresponding to a current position of the device in the scene coordinate system.

The planes may include walls orthogonal to each other and a floor orthogonal to the walls, and the determining of the scene coordinate system may include: aligning a coordinate axis of the scene coordinate system based on the orientation data; and determining an intersection of the walls and the floor to be an origin of the scene coordinate system.

The determining of the depth data may include sensing the target scene using either one or both of a camera and a depth sensor of the device.

The depth data may be determined from sensing data of a current time point, and the orientation data and the position data may correspond to an absolute estimate of the current time point and are determined independently of sensing data of another time point.

The method may include determining a pose of the current time point based on a relative estimate according to a comparison between sensing data of a previous time point and the sensing data of the current time point and the absolute estimate according to the sensing data of the current time point.

The relative estimate may be determined using at least a portion of a visual inertial odometry (VIO) and simultaneous localization and mapping (SLAM).

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with pose estimation includes: one or more processors configured to: determine depth data by sensing a depth of a target scene comprising planes orthogonal to each other; determine normal vectors corresponding to depth points of the depth data; determine orientation data of a device by comparing the normal vectors to orientation candidates; and determine position data of the device based on distances from the device to the planes.

The planes orthogonal to each other may include at least a portion of walls orthogonal to each other and a floor orthogonal to the walls.

For the determining of the normal vectors, the one or more processors may be configured to: generate three-dimensional (3D) space data comprising scene points corresponding to the depth points by unprojecting the depth data onto a 3D space; determine a first local plane based on a first scene point of the 3D space data and neighboring scene points located in a neighborhood of the first scene point; and determine a first normal vector of the first scene point based on a normal of the first local plane.

For the determining of the orientation data, the one or more processors may be configured to: determine a matching number of the orientation candidates in response to performing matching between the normal vectors and the orientation candidates; and determine the orientation data based on the matching number of the orientation candidates.

For the determining of the position data, the one or more processors may be configured to: determine a scene coordinate system based on the distances from the device to the planes and the orientation data; and determine coordinates corresponding to a current position of the device in the scene coordinate system.

The apparatus may include a memory storing instructions that, when executed by the one or more processors, configure the one or more processors to perform the determining of the depth data, the determining of the normal vectors, the determining of the orientation data, and the determining of the position data.

In another general aspect, an electronic apparatus includes: a sensing device configured to generate depth data by sensing a depth of a target scene comprising planes orthogonal to each other; and one or more processors configured to: determine normal vectors corresponding to depth points of the depth data, determine orientation data of a device by comparing the normal vector to orientation candidates, and determine position data of the device based on distances from the device to the planes, wherein the planes orthogonal to each other may include at least a portion of walls orthogonal to each other and a floor orthogonal to the walls.

For the determining of the orientation data, the one or more processors may be configured to: determine a matching number of the orientation candidates in response to performing matching between the normal vectors and the orientation candidates; and determine the orientation data based on the matching number of the orientation candidates.

For the determining of the position data, the one or more processors may be configured to: determine a scene coordinate system based on the distances from the device to the planes and the orientation data; and determine coordinates corresponding to a current position of the device in the scene coordinate system.

In another general aspect, a processor-implemented method with pose estimation includes: determining normal vectors of depth points of a target scene sensed using a device; determining, for each of orientation candidates, a number of the normal vectors orthogonal or parallel to reference directions of the orientation candidate; and determining a pose of the device by determining, as an orientation of the device, an orientation candidate of the orientation candidates corresponding to a greatest number among the determined numbers.

The determining of the pose of the device further may include: determining a scene coordinate system such that an intersection of the orthogonal planes is an origin of the scene coordinate system; and determining a position of the device within the scene coordinate system based on distances from the device to the orthogonal planes.

The target scene may include orthogonal planes, and a plane orthogonal to a reference direction of the orientation candidate corresponding to the greatest number may be parallel to one of the orthogonal planes.

The reference directions of the orientation candidate corresponding to the greatest number may correspond to axes of the orientation of the device.

Other features and aspects will be apparent from the following detailed description, the drawings, and the claims.

Figure 1:
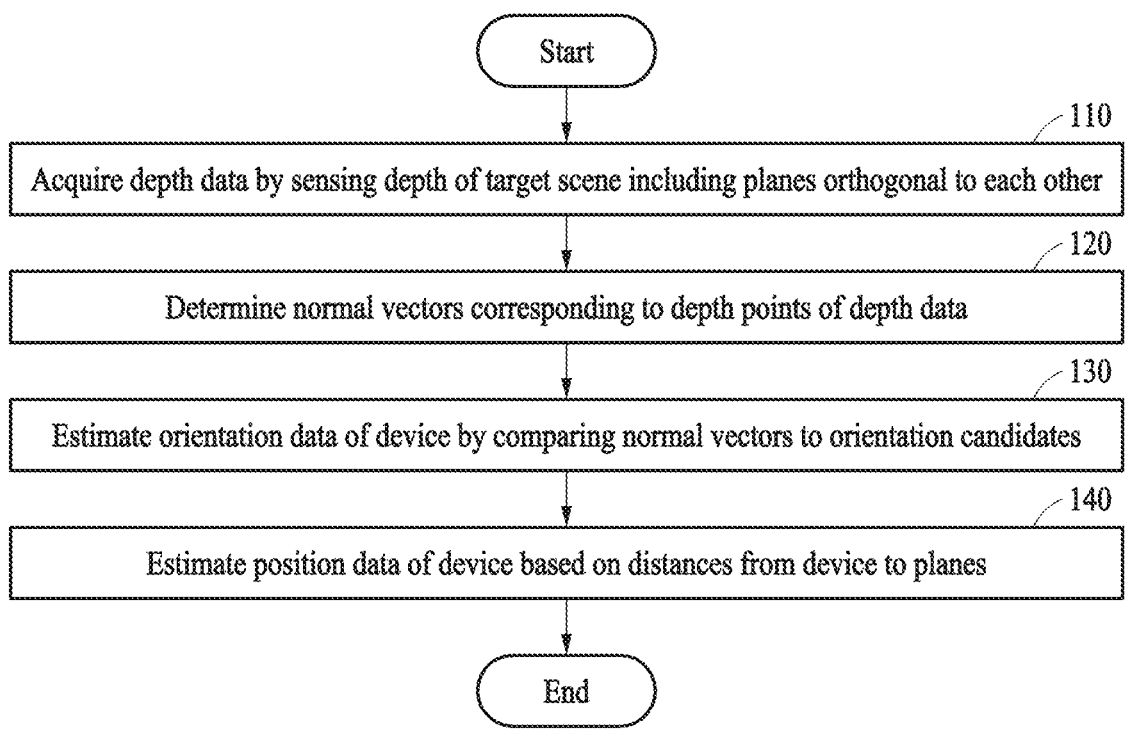
FIG. 1 illustrates an example of an operation of estimating a pose using planes orthogonal to each other.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used to explain various members, components, regions, layers, or sections, these members, components, regions, layers, or sections are not limited to the terms. Rather, these terms should be used only to distinguish one member, component, region, layer, or section from another member, component, region, layer, or section. For example, a "first" member, component, region, layer, or section referred to in examples described herein may also be referred to as a "second" member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong after and understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an example of an operation of estimating a pose using planes orthogonal to each other. A pose estimation apparatus may estimate a pose of a device. The pose may include a position and an orientation. The position may correspond to a translation, and the orientation may correspond to a rotation. For example, the device may provide an augmented reality (AR) and/or virtual reality (VR) function through the estimated pose.

The pose estimation apparatus may estimate a pose of the device using depth data of the planes orthogonal to each other. Such estimation scheme may be referred to as a depth-based estimation scheme. The pose estimation apparatus may perform depth-based estimation independently of visual inertial odometry (VIO) and/or simultaneous localization and mapping (SLAM), or may supplement the VIO and/or the SLAM with a depth-based estimation result. The VIO may estimate a position, a velocity, and an orientation using a camera, an inertial measurement unit (IMU), and the like. The SLAM may estimate a position while simultaneously performing localization and mapping. The VIO may correspond to an elemental technology related to positioning in the SLAM.

The VIO may include a frontend and a backend. In the frontend, a feature point may be extracted from an image. The feature point may be detected at a point where a change in color or brightness is distinct in an image (for example, an end point of a corner or a line segment). Corresponding feature points may be found through feature point matching of images taken at two or more time points, and the position and the orientation of the device may be estimated in the background through such information. In the backend, the position and the orientation of the device may be estimated using the feature point, IMU information, and the like. Also, in the backend, optimization may be performed using a graph-based scheme, a filter-based scheme, and the like.

For example, the graph-based scheme may include a bundle adjustment (BA). In the BA, a plurality of key frames may be collected within a predetermined time window, and position and orientation may be estimated by performing numerical optimization using feature point information observed through the key frames and IMU information measured at a time between key frames. In the filter-based scheme, for each frame, relative positions and orientations of the device between a previous frame and a current frame may be estimated using feature point information and IMU information collected from the two frames. At this time, an extended Kalman filter that applies a Kalman filter by linearizing a nonlinear model may be used. The graph-based scheme may be advantageous in terms of accuracy of optimization, and the filter-based scheme may be advantageous in terms of computational efficiency of optimization.

In terms of the relative positions and orientations estimated through the filter-based scheme, error may be accumulated over time and thus, drift may occur. In a graph-based optimization, when a self-map constructed through a global or local time window is used, absolute position and orientation based on the self-map may be estimated. However, a complexity of optimization may increase significantly with a window size, and a solution of the numerical optimization may correspond to a local optimum solution.

A depth-based estimation scheme may estimate absolute position and orientation of the device without a graph-based optimization process. The depth-based estimation scheme may be combined with a filter-based optimization scheme and/or a graph-based optimization scheme configured to have a relatively small complexity. Such scheme may be referred to as a combined scheme. The combined scheme may further improve a performance of an estimation method and extend the depth-based estimation scheme so as to be applied to a general case.

Depth data of a target scene may be in a form of a depth map. The depth data may be acquired directly from a depth sensor or estimated from one or more images. A predetermined degree of random error in the depth data may not affect an accuracy of a pose estimation of one or more embodiments. When an acquisition period of the depth data is relatively long, for example, when an output frequency of the depth sensor is low or a delay occurs in depth estimation from an image, the depth-based estimation scheme may be combined with the filter-based optimization scheme. In this case, a filter-based relative pose estimation may be performed with high frequency, and a depth-based absolute pose estimation may be performed with low frequency. The absolute estimation data may prevent the drift of the relative estimation data from increasing.

The target scene may include a plurality of planes orthogonal to each other. For example, the planes may include at least a portion of walls orthogonal to each other, a floor orthogonal to the walls, and a ceiling orthogonal to the walls. Such orthogonal planes may be easily observed in an indoor environment. For example, in a vicinity of a corner, two or three walls orthogonal to each other and a floor and/or a ceiling orthogonal to the walls may be observed. When not a corner, one wall or two walls, and a floor and/or a ceiling orthogonal to the wall or walls may be observed. In an outdoor environment, a wall, a floor, and a ceiling may be observed around a building, a road, and the like.

A degree of freedom (DOF) of a pose estimated through the target scene may be determined according to a configuration of the planes in the target scene. For example, when three or more orthogonal planes are photographed, a pose of 6-DOF may be estimated. The pose of the 6-DOF may include a position (x-axis, y-axis, and z-axis) of the 3-DOF and an orientation (roll, pitch, and yaw) of the 3-DOF When two orthogonal planes are photographed, a pose of 5-DOF (position of 2-DOF and orientation of 3-DOF) may be estimated. When one plane is photographed, a pose of 3-DOF (position of 1-DOF and orientation of 2-DOF) may be estimated.

Due to the lack of planes in the target scene, the position and orientation of the device may not be estimated simultaneously at all degrees of freedom through the depth-based estimation scheme. However, even in this case, by combining the depth-based estimation scheme with a filter-based optimization and/or a graph-based optimization, the pose estimation apparatus of one or more embodiments may significantly reduce uncertainty in some dimensions and may prevent drift. In addition, the pose estimation apparatus may identify in advance whether a plane is a major component of the target scene. When the plane is a major component of the target scene, the pose estimation apparatus may use a depth-based estimation or combination scheme. When the plane is not a major component of the target scene, the pose estimation apparatus may perform pose estimation using the filter-based or graph-based scheme while excluding the depth-based estimation scheme.

Referring to FIG. 1, in operation 110, the pose estimation apparatus may acquire depth data by sensing a depth of a target scene including planes orthogonal to each other. The pose estimation apparatus may sense the target scene using either one or both of a depth sensor and a camera of the device. For example, the depth sensor may be a time of flight (TOF) sensor. The camera may be a stereo camera or a mono camera. In a case of a stereo camera, depth data may be acquired through a stereo output. In a case of a mono camera, depth data may be obtained through machine learning. The depth sensor and the camera may also be referred to as a depth measuring device. For example, the depth measuring device may include either one or both of the depth sensor and the camera, where the pose estimation apparatus includes the depth measuring device.

In operation 120, the pose estimation apparatus may determine normal vectors corresponding to depth points of the depth data. The depth data may have a form of a depth map. The depth point may correspond to each depth value of the depth map. The pose estimation apparatus may determine a normal vector corresponding to each depth point (or scene point described below).

The pose estimation apparatus may unproject the depth data onto a 3D space and determine a normal vector using 3D space data. The 3D space may be expressed as 3D coordinates (e.g., x, y, and z coordinates) of the depth measuring device. An origin of the 3D space may correspond to a position of the depth measuring device. When the depth measuring device is mounted on the pose estimation apparatus, coordinates and a position of the depth measuring device may correspond to coordinates and a position of the pose estimation apparatus.

By placing the target scene in a reference coordinate system and specifying the position and the orientation of the device within the reference coordinate system, absolute position and orientation of the device may be estimated. When the same scene is shot at different positions and/or orientations, the reference coordinate system may place the same scene points in the same coordinates. Through this, the position and the orientation of the device may be absolutely determined based on the reference coordinate system.

The pose estimation apparatus may generate 3D space data including scene points corresponding to the depth points by unprojecting the depth data onto the 3D space. When the depth map is based on a two-dimensional (2D) grid, neighboring points of each depth point or each scene point may be specified through the 2D grid. Also, a local normal may be determined using the neighboring points.

For example, when a first depth point of the depth points and a first scene point of the scene points correspond to each other, a first local plane may be determined based on the first scene point of the 3D space data and neighboring scene points located in a neighborhood of the first scene point. Also, a first normal vector of the first scene point may be determined based on a normal of the first local plane. The first normal vector may be used as a normal vector of the first depth point and the first scene point.

In operation 130, the pose estimation apparatus may estimate orientation data of the device by comparing the normal vectors to orientation candidates. When the depth map contains a random error, the normal vector may also contain a random error. However, there may be much more normal vectors pointing in a correct or accurate direction than normal vectors having errors. A direction of the normal vector may be related to the orientation of the device and independent of the position. Accordingly, the pose estimation apparatus may estimate the orientation data of the device first using a normal vector.

The target scene may include a plurality of orthogonal planes as a major component. Normal vectors of scene points existing on one plane (e.g., a floor) may include random errors, but may generally point in the same direction overall. If the overall direction is called a representative direction, the representative direction of the normal vectors of the corresponding plane may be assigned to, or determined as corresponding to, one axis (e.g., y-axis) of the reference coordinate system. A representative direction of normal vectors of scene points existing on another plane (e.g., a wall) may be assigned to, or determined as corresponding to, another axis (e.g., x-axis) of the reference coordinate system. The other axis (e.g., z-axis) may be determined according to a right hand rule. Through this, three axes of the reference coordinate system may be determined.

Various planar structures may exist according to circumstances, and it may not be easy to determine which scene points exist on the same plane. The pose estimation apparatus may estimate the orientation through voting. The pose estimation apparatus may quantize possible orientations and define the quantized orientations as orientation candidates. For example, the pose estimation apparatus may quantize possible orientations of 3-DOF and express the orientations as a 3D histogram. The pose estimation apparatus may perform a process of voting through uniform binning. As the quantization is more densely performed, an accuracy of the orientation may increase and a complexity thereof may increase. Accordingly, the pose estimation apparatus may alleviate trade-offs by using a hierarchical method, hashing, a neural network-based representation, or the like.

All quantized orientations may be orientation candidates, and all scene points (or all depth points) may be voters. Each scene point may vote for an orientation candidate that is orthogonal or parallel to a normal vector of the corresponding scene point. Hereinafter, an orthogonal relationship or a parallel relationship may be referred to as a matching relationship. For example, when the x-axis, y-axis, and z-axis may be determined based on an orientation candidate, and when a normal vector corresponds to any one of the x-axis, y-axis, and z-axis, a scene point of the normal vector may vote for the orientation candidate. When there are a plurality of orientation candidates that are in a matching relationship with a normal vector of a scene point, the scene point may vote for the plurality of orientation candidates. For example, when the corresponding normal vector has the matching relationship with another orientation candidate, the corresponding normal vector may vote for the another orientation candidate.

A voting target may be extended to orientation candidates close to the matching relationship beyond the exact matching relationship. For example, orthogonal or parallel orientation candidates having a difference within a threshold value may be selected for voting. In this example, a lower weight may be given to a vote value of an approximate matching relationship compared to a vote value of an exact matching relationship. A uniform weight may be applied to the matching difference within the threshold or a lower weight may be applied as the matching difference within the threshold increases. An orientation candidate that has obtained a largest vote value may be determined as an orientation of the device.

Matching between normal vectors and orientation candidates may be made according to the vote of the scene points. The pose estimation apparatus may implement voting through the matching. When a scene point votes for an orientation candidate, a normal vector of the scene point and the orientation candidate may be matched. The pose estimation apparatus may measure a matching number of the orientation candidates while performing matching between the normal vectors and the orientation candidates and estimate the orientation data based on the matching number of the orientation candidates. For example, the normal vectors may include the first normal vector, and the pose estimation apparatus may match the first normal vector and at least a portion of the orientation candidates having the orthogonal relationship or the parallel relationship with the first normal vector among the orientation candidates. The matching number of an orientation candidate may increase as the number of normal vectors matched to the orientation candidate increases. The matching number may correspond to a vote value. The pose estimation apparatus may estimate the orientation candidate having the largest matching number as an orientation of the device.

In operation 140, the pose estimation apparatus may estimate position data of the device based on distances from the device to the planes. When the orientation of the device is estimated, the pose estimation apparatus may express the position of the device in a 3D coordinate system using the orientation of the device. The pose estimation apparatus may acquire depths of scene points having normal vectors in each axial direction based on the depth data. Through this, the pose estimation apparatus may calculate a distance from each orthogonal plane. When the depth contains a random error, the distance from each plane may be calculated through a regression process that minimizes a specific objective function (e.g., a square error).

When the distance from each plane is calculated, the pose estimation apparatus may select dominant planes and may align the coordinate axes so that the dominant planes coincide with the xy-plane, the yz-plane, and the xz-plane of the 3D coordinate system. The pose estimation apparatus may select the dominant planes from the depth data and/or the 3D space data using the normal vectors. The dominant planes may correspond to the orthogonal planes (the wall, the floor, and the ceiling) in the target scene, for example. When the coordinate axes are aligned, the position of the device may be specified based on the 3D coordinate value. The pose estimation apparatus may determine an origin based on the planes and determine coordinates corresponding to a current position of the device based on the origin. When the planes include walls orthogonal to each other and a floor orthogonal to the walls, an intersection of the walls and the floors may be determined as the origin. As a result, the pose (including the position and the orientation) of the device may correspond to an absolute estimate based on a 3D coordinate system.

Figure 2:
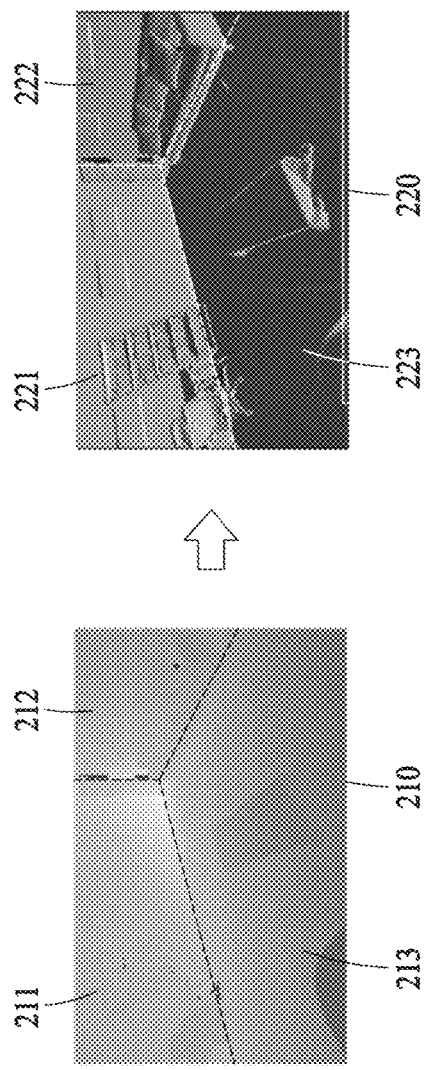
FIG. 2 illustrates an example of depth data and three-dimensional (3D) space data.

FIG. 2 illustrates an example of depth data and 3D space data. Referring to FIG. 2, in depth data 210, planes 211, 212, and 213 orthogonal to each other in a target scene may appear or be present. For example, the planes 211 and 212 may be walls, and the plane 213 may be a floor. The depth data 210 may be expressed in a form of a depth map. In the depth map, the depth may be represented by a warmer or brighter color as a value of the depth increases (or as a distance from a device, for example, a depth measuring device, increases) and represented by a cooler or darker color as the value of the depth decreases (or as the distance from the device, for example, the depth measuring device, decreases). The depth data 210 of FIG. 2 is shown with a color representation of the depth map converted to grayscale. In grayscale, warm colors may generally appear at a relatively high brightness, and cool colors may generally appear at a relatively low brightness.

A normal image 220 may represent a normal vector of each depth point of the depth data 210 by a different color. The normal vector may be obtained through an unprojection onto a 3D space. In the normal image 220, depth points having the same normal vector value may be expressed by the same color. In the normal image 220 of FIG. 2, the color representation is converted to grayscale, so colors are less distinguishable, but the colors are mostly distinguishable through shading. Planes 221, 222, and 223 (respectively corresponding to the planes 211, 212, and 213) may be distinguished through the shading of the normal image 220.

Figure 3:
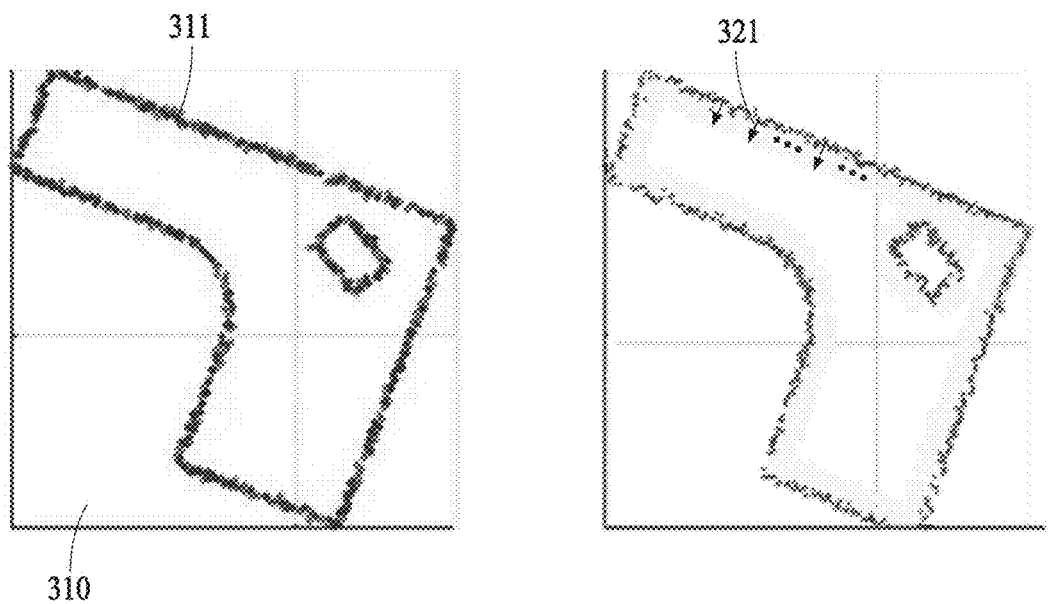
FIGS. 3 and 4 illustrate an example of an operation of estimating an orientation using a normal vector.
Figure 4:
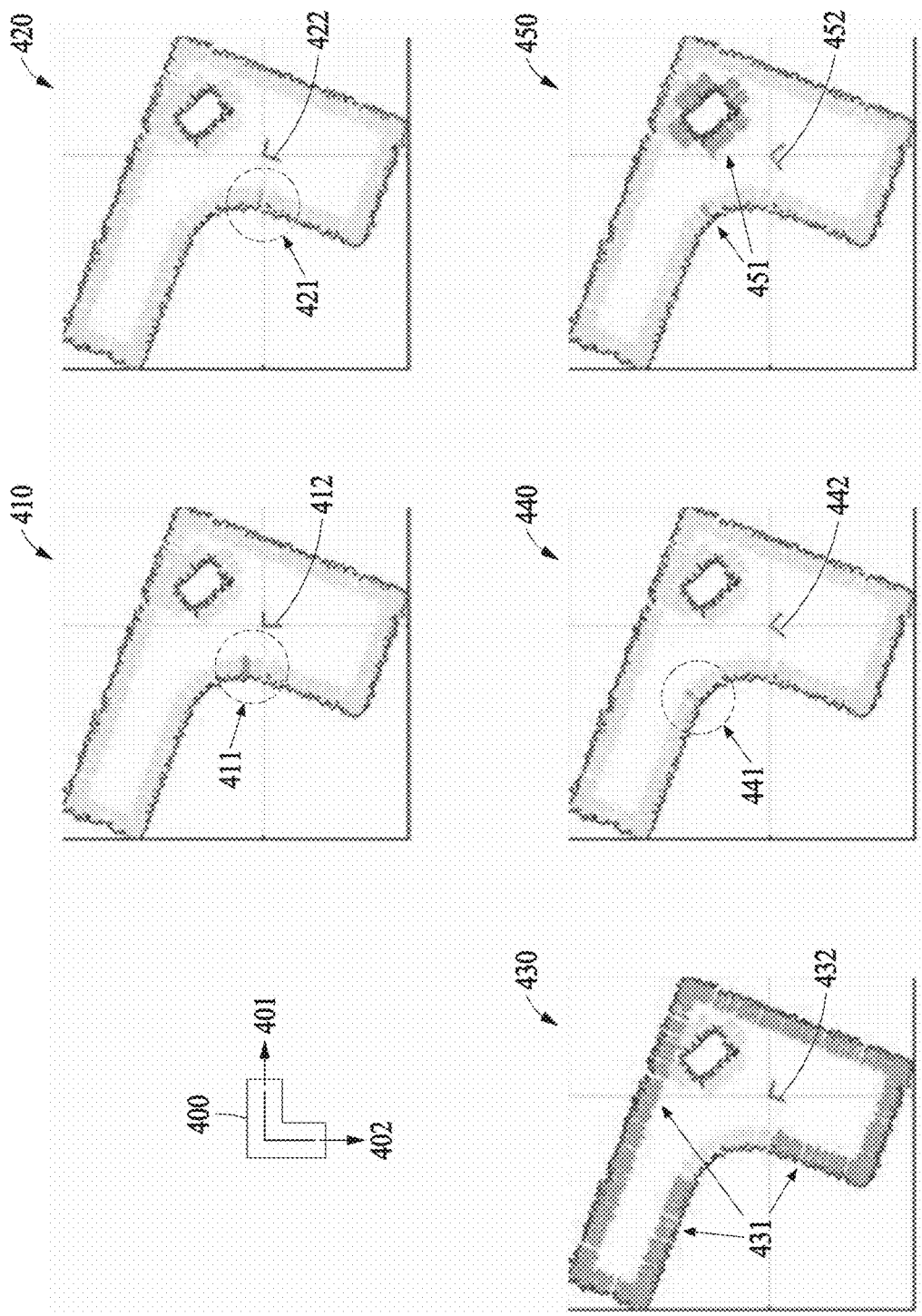

FIGS. 3 and 4 illustrate an example of an operation of estimating an orientation using a normal vector. In FIGS. 3 and 4, for ease and convenience, a space where a device is positioned is expressed as a 2D plane. In practice, however, the space in which the device is positioned may correspond to a 3D space.

Referring to FIG. 3, a point 311 of a frame 310 may correspond to a scene point. Through points in the frame 310 such as the point 311, it can be seen that orthogonal planes exist in the space where the device is positioned. A normal vector 321 corresponding to the point 311 may be determined based on the point 311. For example, the normal vector 321 may be determined based on a normal of the local area to which the point 311 belongs. In this way, normal vectors corresponding to all points in the image frame 310 may be determined.

Referring to FIG. 4, an orientation of a device 400 may be identified based on reference directions 401 and 402. For example, the reference direction 401 may be a front direction (or a gaze direction of a sensor or a lens) of the device 400 (or a sensor or a camera), and the reference direction 402 may be a lateral direction of a body of the device (or the sensor or the camera). In frames 410 through 450, normal vectors are blurred and normal vectors matching the reference directions 401 and 402 according to the orientation of the device 400 are emphasized there among. When a normal vector is orthogonal or parallel to at least a portion of the reference directions 401 and 402 (e.g., orthogonal or parallel to either one of the reference directions 401 and 402), the normal vector may match the reference directions 401 and 402. In this case, normal vectors 411 may be voters for a first orientation candidate 412 and normal vectors 421 may be voters for a second orientation candidate 422. Likewise, normal vectors 431, 441, and 451 may respectively be voters for remaining orientation candidates 432, 442, and 452.

A pose estimation apparatus may estimate an orientation that receives most votes from the normal vectors among the orientation candidates 412 through 452 as an orientation of the device 400. For example, when the second orientation candidate 422 is an actual orientation of the device 400, the third orientation candidate 432 may receive the most votes from the normal vectors. In this example, the third orientation candidate 432 may be estimated as the orientation of the device 400. Also, one (e.g., a first orientation, for example, the orientation candidate 412) of the orientation candidates 412 through 452 may be determined as a reference orientation (e.g., zero degree). In this case, an estimated orientation may correspond to an absolute estimate.

Figure 5:
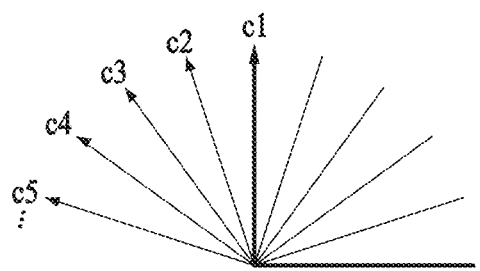
FIG. 5 illustrates an example of orientation candidates.

FIG. 5 illustrates an example of orientation candidates. Referring to FIG. 5, orientation candidates c1 through c5 are indicated by symbols like those of the device 400 of FIG. 4. An axis along which an arrow is drawn may be a gaze direction, and remaining axes may correspond to a lateral direction. Although the orientation candidates c1 through c5 are shown to have 1-DOF (e.g., yaw) for ease and convenience of description, orientation candidates may be expressed to have 2-DOF and 3-DOF using additional orientations of different axes (e.g., roll and pitch). Also, the orientation candidates c1 through c5 are merely provided as an example and thus, the orientation candidates c1 through c5 may be in different forms for distinguishing orientations and quantized with different densities.

Figure 6:
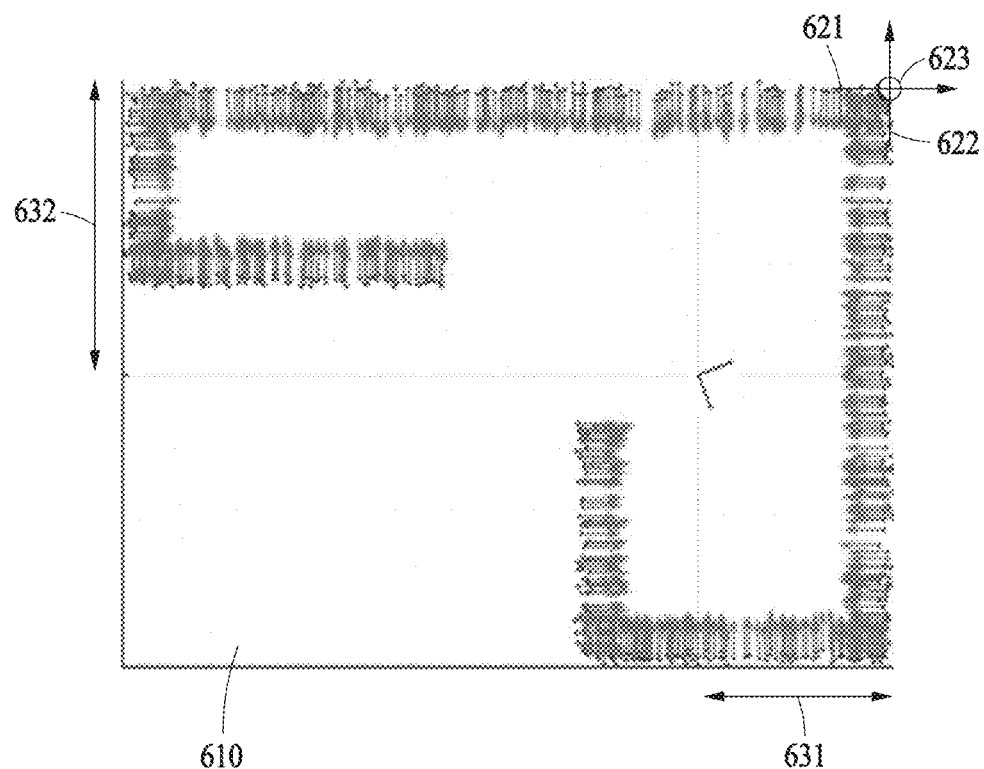
FIG. 6 illustrates an example of an operation of estimating a position using a coordinate axis alignment.

FIG. 6 illustrates an example of an operation of estimating a position using a coordinate axis alignment. Referring to FIG. 6, when an orientation of a device is estimated in the example of FIGS. 3 and 4, coordinate axes of 3D space data may be aligned using the estimated orientation. A pose estimation apparatus may calculate a distance from each orthogonal plane based on depths of scene points having normal vectors in each axial direction, and align coordinate axes so that dominant planes coincide with an xy-plane, a yz-plane, and an xz-plane of a 3D coordinate system. Although FIG. 6 illustrates a space in which the device is positioned in two dimensions, an actual space may be a 3D space. The pose estimation apparatus may align dominant planes corresponding to arrows 621 and 622 to coordinate axes, and define an intersection 623 of the dominant planes as an origin. The pose estimation apparatus may estimate a position of the device based on distances 631 and 632 from the dominant planes. The position may correspond to an absolute estimate based on a coordinate system according to the origin and the dominant planes.

Figure 7:
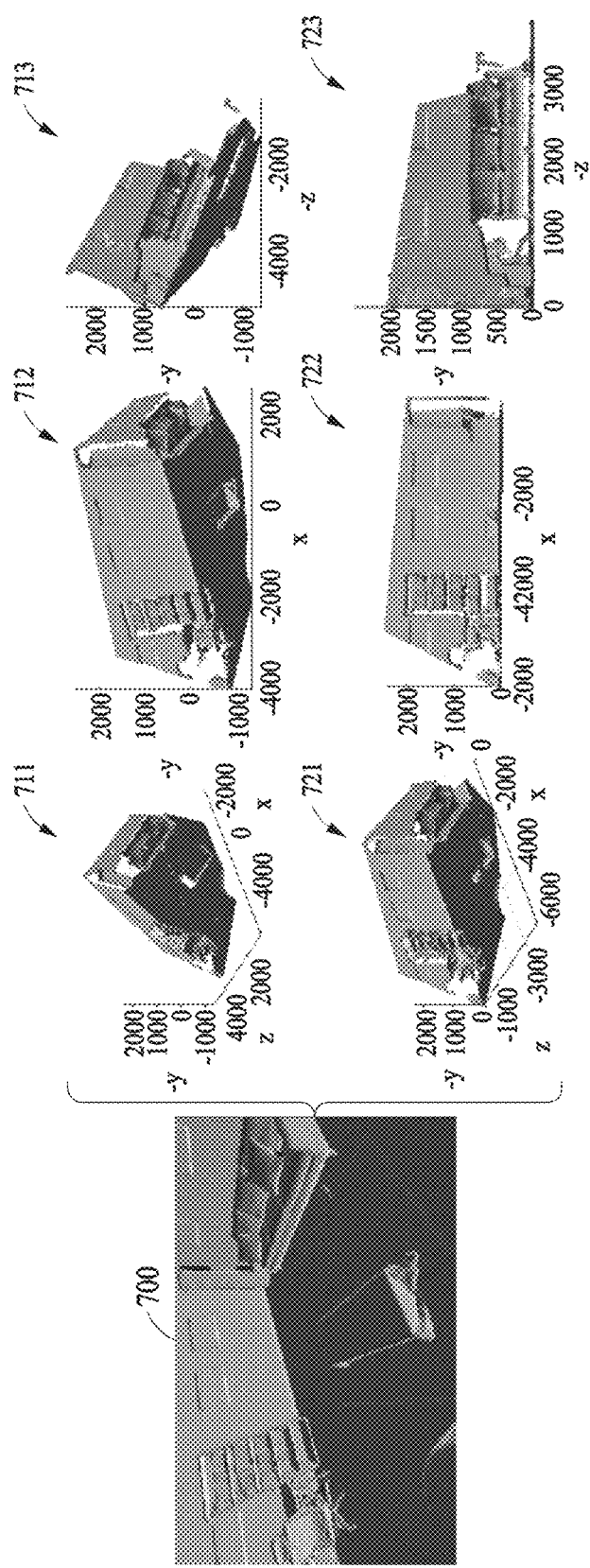
FIGS. 7 and 8 illustrate an example of an operation of estimating a pose using an exemplary frame.
Figure 8:
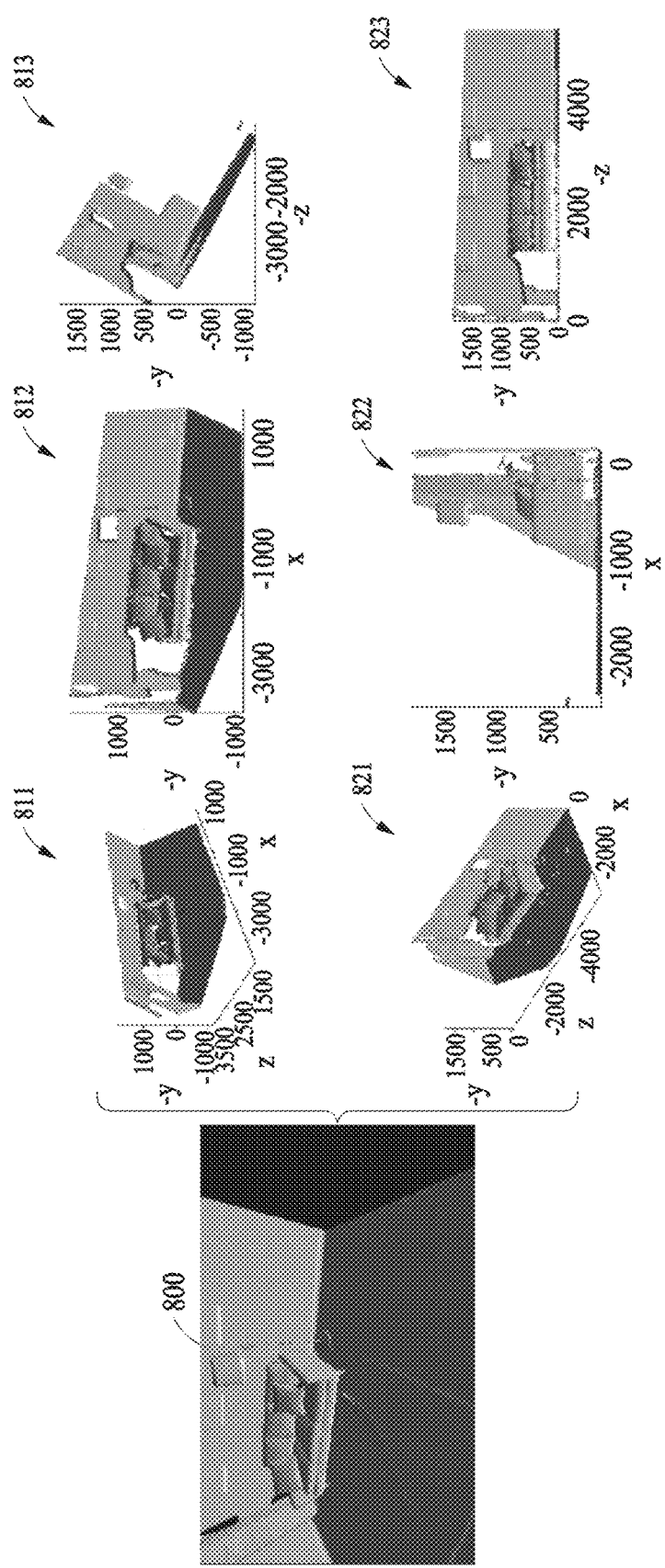

FIGS. 7 and 8 illustrate an example of an operation of estimating a pose using an exemplary frame. In FIGS. 7 and 8, image frames 700 and 800 are expressed in a form of a normal image. Through this, orthogonal planes of target scenes of the image frames 700 and 800 may be easily distinguished. Sofas shown in the image frames 700 and 800 may correspond to the same object.

Points of the image frame 700 may be unprojected onto a 3D space and converted into 3D space data. A graph 711 represents 3D space data of a xyz coordinate system of a device. An origin of the coordinate system of the device may correspond to a position of the device. Graphs 712 and 713 represent versions of 3D space data projected onto an xy coordinate system and an yz coordinate system of the device.

An orientation of the device may be estimated through normal vectors of the image frame 700. When the orientation of the device is estimated, coordinate axis alignment may be performed based on the estimated orientation and distance data, and a scene coordinate system may be derived from the coordinate system of the device. A graph 721 represents 3D space data of the xyz coordinate system of a scene. An origin of the scene coordinate system may correspond to an intersection of orthogonal planes. Graphs 722 and 723 represent versions of 3D space data projected onto an xy coordinate system and a yz coordinate system of the scene. When the scene coordinate system is derived, an absolute position of the device in the scene coordinate system may be estimated.

The image frame 800 may correspond to a subsequent frame of the image frame 700 (e.g., a frame subsequent to the image frame 700). Graphs 811 through 813 may represent 3D space data of the image frame 800 through the coordinate system of the device. Graphs 821 through 823 may represent the 3D space data through a scene coordinate system. The scene coordinate system of the graphs 821 through 823 may correspond to the same coordinate system sharing the origin with the scene coordinate system of the graphs 721 through 723 of FIG. 7. Accordingly, an absolute position of the device in the scene coordinate system may be estimated.

Figure 9:
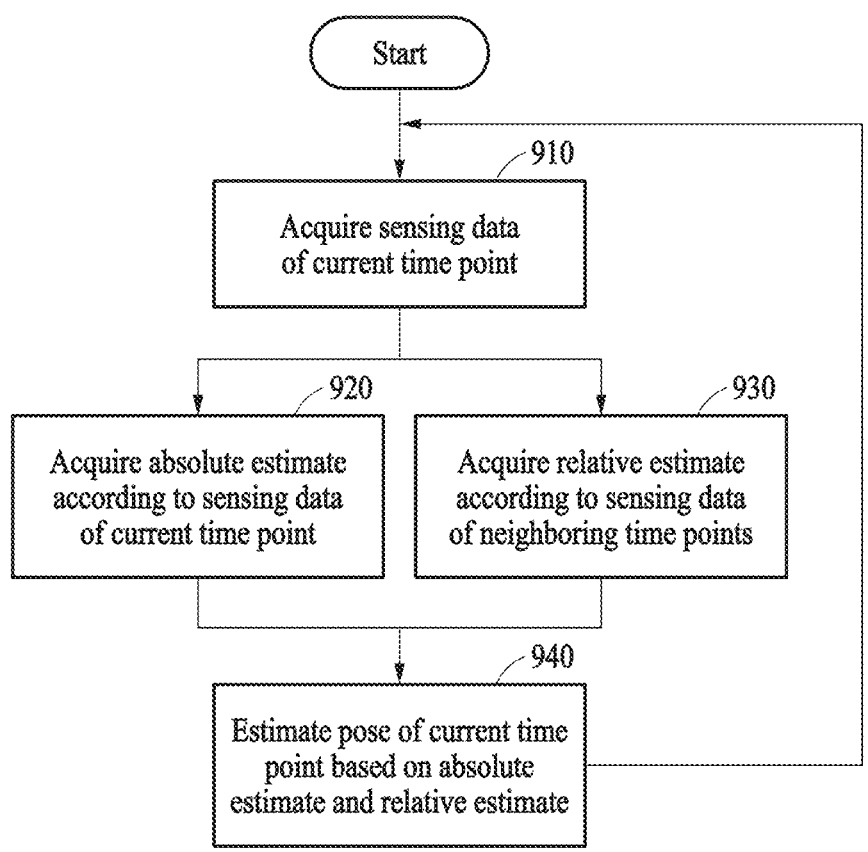
FIG. 9 illustrates an example of an operation of estimating a pose by fusing an absolute estimate and a relative estimate.

FIG. 9 illustrates an example of an operation of estimating a pose by fusing an absolute estimate and a relative estimate. As described above, a pose estimated based on a depth-based estimation scheme may have an absolute characteristic, and a pose estimated through a VIO and SLAM may have a relative characteristic. A pose estimation apparatus may perform pose estimation by fusing the two characteristics.

Referring to FIG. 9, in operation 910, the pose estimation apparatus may acquire current sensing data. The pose estimation apparatus may acquire sensing data of each time point from a sensing device. The sensing device may generate sensing data over successive time points. For example, the sensing device may generate at least a portion of depth data, visual data, and inertial data. The sensing device may include at least a portion of a depth sensor, a camera, and an inertial sensor. The sensing device may generate depth data through a depth measuring device (e.g., a depth sensor and a camera), generate visual data through the camera, and generate inertial data through the inertial sensor.

In operation 920, the pose estimation apparatus acquires an absolute estimate according to the sensing data of the current time point. The pose estimation apparatus may acquire depth data of the current time point from the sensing data of the current time point and acquire an absolute estimate of the current time point by performing a depth-based pose estimation based on the depth data of the current time point. The absolute estimate may represent the absolute orientation and absolute position of the current time point. The absolute orientation may represent an absolute value from a reference orientation of orientation candidates. The absolute position may represent an absolute value from an origin of a scene coordinate system.

In operation 930, the pose estimation apparatus acquires a relative estimate according to sensing data of neighboring time points. The pose estimation apparatus may acquire a relative estimate through a comparison between sensing data of a previous time point and the sensing data of the current time point. For example, a change between feature points extracted from visual data of the previous time point (e.g., a color image) and feature points extracted from visual data of the current time point, and a change in inertia data between the previous time point and the current time point may be used. The relative estimate may represent a change in a pose according to the change in feature points and/or the change in inertial data. The pose estimation apparatus may determine the relative estimate using at least a portion of the VIO and the SLAM.

In operation 940, the pose estimation apparatus estimates a pose of the current time point based on the absolute estimate and the relative estimate. The pose estimation apparatus may use the relative estimate to remove an uncertainty of the absolute estimate, for example, an uncertainty due to the lack of the number of planes in the target scene, and/or may use the absolute estimate to remove an uncertainty of the relative estimate, for example, drift due to error accumulation.

Figure 10:
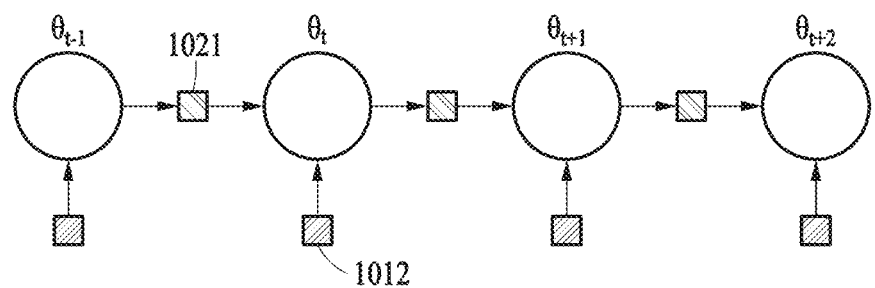
FIG. 10 illustrates an example of a point in time at which an absolute estimate and a relative estimate are used.

FIG. 10 illustrates an example of a point in time at which an absolute estimate and a relative estimate are used. In FIG. 10, $\theta_t$ denotes a pose of a point in time t. Squares placed between poses represent relative estimates. Squares independently connected to the poses represent absolute estimates. The pose estimation apparatus may estimate a pose by fusing an absolute estimate and a relative estimate. For example, a relative estimate 1021 may represent a relative pose change between a pose of a point in time t−1 and the pose of the point in time t. Also, the absolute estimate 1012 may represent an absolute pose of the point in time t. The pose estimation apparatus may fuse the relative estimate 1021 and the absolute estimate 1012 to remove an uncertainty of each of the relative estimate 1021 and the absolute estimate 1012 and improve an accuracy of pose estimation.

Figure 11:
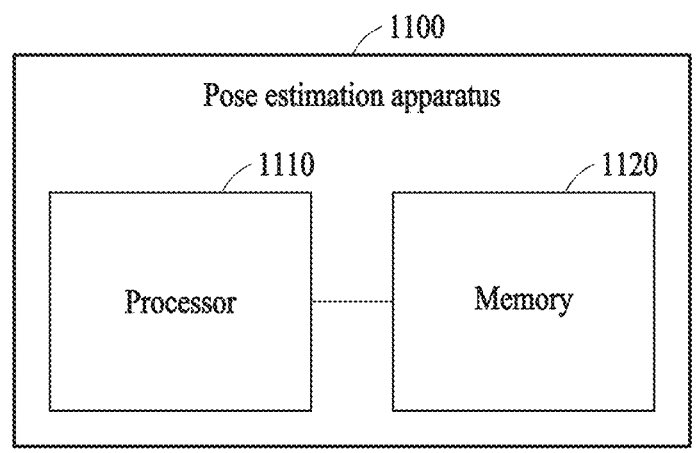
FIG. 11 illustrates an example of a pose estimation apparatus.

FIG. 11 illustrates an example of a pose estimation apparatus. Referring to FIG. 11, a pose estimation apparatus 1100 may include a processor 1110 (e.g., one or more processors) and a memory 1120 (e.g., one or more memories). The memory 1120 may be connected to the processor 1110 and store instructions to be executed by the processor 1110, data to be computed by the processor 1110, or data that has been processed by the processor 1110. The memory 1120 may include a non-transitory computer-readable medium, for example, a high-speed random-access memory and/or a non-volatile computer-readable storage media (e.g., one or more disk storage devices, flash memory devices, or other non-volatile solid state memory devices.

The processor 1110 may execute instructions to perform any one or more or all of the operations of FIGS. 1 through 10, and 12. For example, the processor 1110 may acquire depth data by sensing a depth of a target scene including planes orthogonal to each other, determine normal vectors corresponding to depth points of the depth data, estimate orientation data of a device by comparing the normal vectors to orientation candidates, and estimate position data of the device based on distances from the device to the planes. The pose estimation apparatus 1100 may be disposed inside the device or disposed outside the device. In addition, the description of FIGS. 1 through 10, and 12 may apply to the pose estimation apparatus 1100.

Figure 12:
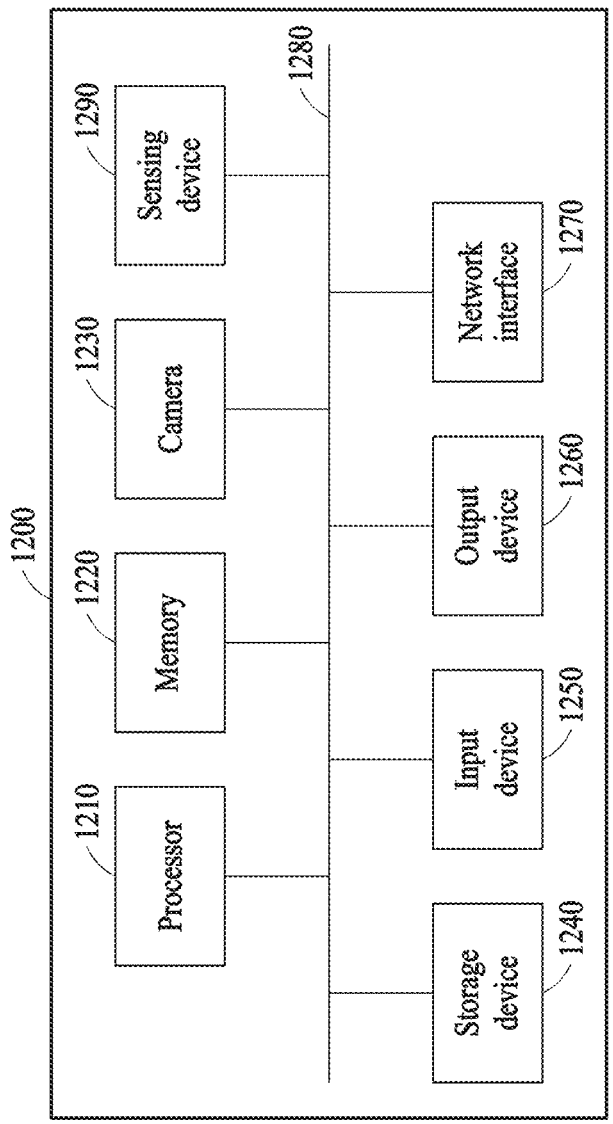
FIG. 12 illustrates an example of an electronic apparatus.

FIG. 12 illustrates an example of an electronic apparatus. Referring to FIG. 12, an electronic apparatus 1200 includes a processor 1210 (e.g., one or more processors), a memory 1220 (e.g., one or more memories), a camera 1230, a storage device 1240, an input device 1250, an output device 1260, a sensing device 1290, and a network interface 1270. The processor 1210, the memory 1220, the camera 1230, the storage device 1240, the input device 1250, the output device 1260, the sensing device 1290, and the network interface 1270 may communicate through a communication bus 1280. For example, the electronic apparatus 1200 may be implemented as a portion of a mobile device such as a mobile phone, a smartphone, a PDA, a netbook, a tablet computer, and a laptop computer, a wearable device such as a smart watch, a smart band, and smart glasses, a computing device such as a desktop and a server, home appliances such as a television (TV) a smart TV, and a refrigerator, a security device such as a door lock, or a vehicle such as a smart car. The electronic apparatus 1200 may include the pose estimation apparatus 1100 of FIG. 11 as a structural and/or functional part.

The processor 1210 executes functions and instructions for execution in the electronic apparatus 1200. For example, the processor 1210 may process instructions stored in the memory 1220 or the storage device 1240. The processor 1210 may perform any one or more or all operations described above with reference to FIGS. 1 through 11. The memory 1220 may include a computer-readable storage medium or a computer-readable storage device. The memory 1220 may store instructions to be executed by the processor 1210 and store relevant information while software and/or an application is executed by the electronic apparatus 1200.

The camera 1230 may capture an image and/or a video. The camera 1230 may include any one or more or all of the cameras described above with reference to FIGS. 1 through 11. The sensing device 1290 may include at least a portion of a depth sensor, a camera (e.g., the camera 1230), and an inertial sensor and generate at least a portion of depth data, visual data, and inertial data. The sensing device 1290 may include any one or more or all of the depth sensors described above with reference to FIGS. 1 through 11. The storage device 1240 includes a computer-readable storage medium or a computer-readable storage device. The storage device 1240 may store a larger quantity of information compared to the memory 1220 and store information for a long time. The storage device 1240 may include, for example, a magnetic hard disk, an optical disk, a flash memory, a floppy disk, or other types of non-volatile memories known in the art.

The input device 1250 may receive an input from a user based on a traditional input method using a keyboard and a mouse and a new input method such as a touch input, a voice input, and an image input. For example, the input device 1250 may include any device that detects an input from a keyboard, a mouse, a touch screen, a microphone, or a user and transfers the detected input to the electronic apparatus 1200. The output device 1260 may provide an output of the electronic apparatus 1200 to a user through a visual, auditory, or tactile channel. The output device 1260 may include, for example, a display, a touch screen, a speaker, a vibration generating device, or any device for providing an output to a user. The network interface 1270 may communicate with an external device through a wired or wired network.

The pose estimation apparatuses, processors, memories, electronic apparatuses, cameras, storage devices, input devices, output devices, sensing devices, network interfaces, communication buses, pose estimation apparatus 1100, processor 1110, memory 1120, electronic apparatus 1200, processor 1210, memory 1220, camera 1230, storage device 1240, input device 1250, output device 1260, sensing device 1290, network interface 1270, communication bus 1280, pose estimation apparatus 1100, processor 1110, memory 1120, electronic apparatus 1200, processor 1210, memory 1220, camera 1230, storage device 1240, input device 1250, output device 1260, sensing device 1290, network interface 1270, communication bus 1280, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with pose estimation, the method comprising:
    determining depth data by sensing a depth of a target scene comprising planes orthogonal to each other;
    determining normal vectors corresponding to depth points of the depth data;
    determining orientation data of a device by comparing the normal vectors to orientation candidates, the orientation candidates being possible orientations of the devices;
    determining position data of the device based on distances from the device to the planes; and
    providing an augmented reality (AR) and/or virtual reality (VR) function using an estimated pose associated with the orientation data and the position data of the device.

2. The method of claim 1, wherein the planes orthogonal to each other comprise at least a portion of walls orthogonal to each other and a floor orthogonal to the walls.

3. The method of claim 1, wherein the determining of the normal vectors comprises:
    generating three-dimensional (3D) space data comprising scene points corresponding to the depth points by unprojecting the depth data onto a 3D space;
    determining a first local plane based on a first scene point of the 3D space data and neighboring scene points located in a neighborhood of the first scene point; and
    determining a first normal vector of the first scene point based on a normal of the first local plane.

4. The method of claim 1, wherein the determining of the orientation data comprises:
    determining a matching number of the orientation candidates in response to performing matching between the normal vectors and the orientation candidates; and
    determining the orientation data based on the matching number of the orientation candidates.

5. The method of claim 4, wherein
    the normal vectors comprise a first normal vector, and
    the determining of the matching number comprises matching the first normal vector and one or more orientation candidates having either one of an orthogonal relationship and a parallel relationship with the first normal vector among the orientation candidates.

6. The method of claim 1, wherein the determining of the position data comprises:
    determining a scene coordinate system based on the distances from the device to the planes and the orientation data; and
    determining coordinates corresponding to a current position of the device in the scene coordinate system.

7. The method of claim 6, wherein
    the planes comprise walls orthogonal to each other and a floor orthogonal to the walls, and
    the determining of the scene coordinate system comprises:
        aligning a coordinate axis of the scene coordinate system based on the orientation data; and
        determining an intersection of the walls and the floor to be an origin of the scene coordinate system.

8. The method of claim 1, wherein the determining of the depth data comprises sensing the target scene using either one or both of a camera and a depth sensor of the device.

9. The method of claim 1, wherein
    the depth data is determined from sensing data of a current time point, and
    the orientation data and the position data correspond to an absolute estimate of the current time point and are determined independently of sensing data of another time point.

10. The method of claim 9, further comprising determining a pose of the current time point based on a relative estimate according to a comparison between sensing data of a previous time point and the sensing data of the current time point and the absolute estimate according to the sensing data of the current time point.

11. The method of claim 10, wherein the relative estimate is determined using at least a portion of a visual inertial odometry (VIO) and simultaneous localization and mapping (SLAM).

12. A non-transitory computer-readable storage medium storing instructions that, when executed by one or more processors, configured the one or more processors to perform the method of claim 1.

13. The method of claim 1,
    wherein the determining of the normal vectors comprises determining the normal vectors using a device, and
    wherein the comparing of the normal vectors to the orientation candidates comprises determining, for each of the orientation candidates, a number of the normal vectors orthogonal or parallel to reference directions of the orientation candidate; and
    further comprising determining a pose of the device by determining, as an orientation of the device, an orientation candidate of the orientation candidates corresponding to a greatest number among the determined numbers.

14. An apparatus with pose estimation, the apparatus comprising:
    one or more processors configured to:
        determine depth data by sensing a depth of a target scene comprising planes orthogonal to each other;
        determine normal vectors corresponding to depth points of the depth data;
        determine orientation data of a device by comparing the normal vectors to orientation candidates, the orientation candidates being possible orientations of the devices;
        determine position data of the device based on distances from the device to the planes; and
        provide an augmented reality (AR) and/or virtual reality (VR) function using an estimated pose associated with the orientation data and the position data of the device.

15. The apparatus of claim 14, wherein the planes orthogonal to each other comprise at least a portion of walls orthogonal to each other and a floor orthogonal to the walls.

16. The apparatus of claim 14, wherein, for the determining of the normal vectors, the one or more processors are configured to:
    generate three-dimensional (3D) space data comprising scene points corresponding to the depth points by unprojecting the depth data onto a 3D space;
    determine a first local plane based on a first scene point of the 3D space data and neighboring scene points located in a neighborhood of the first scene point; and determine a first normal vector of the first scene point based on a normal of the first local plane.

17. The apparatus of claim 14, wherein, for the determining of the orientation data, the one or more processors are configured to:
determine a matching number of the orientation candidates in response to performing matching between the normal vectors and the orientation candidates; and
determine the orientation data based on the matching number of the orientation candidates.

18. The apparatus of claim 14, wherein, for the determining of the position data, the one or more processors are configured to:
determine a scene coordinate system based on the distances from the device to the planes and the orientation data; and
determine coordinates corresponding to a current position of the device in the scene coordinate system.

19. The apparatus of claim 14, further comprising a memory storing instructions that, when executed by the one or more processors, configure the one or more processors to perform the determining of the depth data, the determining of the normal vectors, the determining of the orientation data, and the determining of the position data.

20. An electronic apparatus comprising:
a sensing device configured to generate depth data by sensing a depth of a target scene comprising planes orthogonal to each other; and
one or more processors configured to:
determine normal vectors corresponding to depth points of the depth data,
determine orientation data of a device by comparing the normal vector to orientation candidates, the orientation candidates being possible orientations of the devices,
determine position data of the device based on distances from the device to the planes, and
provide an augmented reality (AR) and/or virtual reality (VR) function using an estimated pose associated with the orientation data and the position data of the device, wherein the planes orthogonal to each other comprise at least a portion of walls orthogonal to each other and a floor orthogonal to the walls.

21. The electronic apparatus of claim 20, wherein, for the determining of the orientation data, the one or more processors are configured to:
determine a matching number of the orientation candidates in response to performing matching between the normal vectors and the orientation candidates; and
determine the orientation data based on the matching number of the orientation candidates.

22. The electronic apparatus of claim 20, wherein, for the determining of the position data, the one or more processors are configured to:
determine a scene coordinate system based on the distances from the device to the planes and the orientation data; and
determine coordinates corresponding to a current position of the device in the scene coordinate system.

23. A processor-implemented method with pose estimation, the method comprising:
determining normal vectors of depth points of a target scene sensed using a device;
determining, for each of orientation candidates, a number of the normal vectors orthogonal or parallel to reference directions of the orientation candidate; and
determining a pose of the device by determining, as an orientation of the device, an orientation candidate of the orientation candidates corresponding to a greatest number among the determined numbers; and
providing an augmented reality (AR) and/or virtual reality (VR) function using the determined pose.

24. The method of claim 23, wherein the determining of the pose of the device further comprises:
determining a scene coordinate system such that an intersection of the orthogonal planes is an origin of the scene coordinate system; and
determining a position of the device within the scene coordinate system based on distances from the device to the orthogonal planes.

25. The method of claim 23, wherein
the target scene comprises orthogonal planes, and
a plane orthogonal to a reference direction of the orientation candidate corresponding to the greatest number is parallel to one of the orthogonal planes.

26. The method of claim 23, wherein the reference directions of the orientation candidate corresponding to the greatest number correspond to axes of the orientation of the device.

* * * * *